US009777591B2

(12) United States Patent
Tine et al.

(10) Patent No.: US 9,777,591 B2
(45) Date of Patent: Oct. 3, 2017

(54) AIRFOIL RESONANT FREQUENCY TESTING

(71) Applicant: United Technologies Corporation, Hartford, CT (US)

(72) Inventors: Steven Tine, Middletown, CT (US); Richard A. Lomenzo, Jr., Enfield, CT (US); Kevin J. Klinefelter, Uncasville, CT (US); Elizabeth F. Vinson, Wethersfield, CT (US); Kaitlin Olsen, Manchester, CT (US); Thomas R. Davis, Cheshire, CT (US)

(73) Assignee: United Technologies Corporation, Farmington, CT (US)

( * ) Notice: Subject to any disclaimer, the term of this patent is extended or adjusted under 35 U.S.C. 154(b) by 282 days.

(21) Appl. No.: 14/619,757

(22) Filed: Feb. 11, 2015

(65) Prior Publication Data

US 2016/0230588 A1 Aug. 11, 2016

(51) Int. Cl.
  *G01H 13/00* (2006.01)
  *G01H 9/00* (2006.01)
  *F01D 21/00* (2006.01)

(52) U.S. Cl.
  CPC .......... *F01D 21/003* (2013.01); *G01H 9/00* (2013.01); *G01H 13/00* (2013.01);
  (Continued)

(58) Field of Classification Search
  CPC ........ F01D 21/003; G01H 9/00; G01H 9/008; G01H 9/002; F05D 2240/12;
  (Continued)

(56) References Cited

U.S. PATENT DOCUMENTS 1,316,260 A * 9/1919 Zahm .................. G01N 29/12
  73/583
2,576,423 A 11/1951 Stewart
(Continued)

FOREIGN PATENT DOCUMENTS

JP 2000318696 A 11/2000

OTHER PUBLICATIONS

Extended European Search Report for EP Application No. 16154817.7, dated Jun. 23, 2016, 11 pages.
(Continued)

*Primary Examiner* — Laura Martin
*Assistant Examiner* — Rose M Miller
(74) *Attorney, Agent, or Firm* — Kinney & Lange, P.A.

(57) ABSTRACT

A resonant frequency testing system for airfoils comprises a broach block, a clamp, an acoustic speaker, a laser vibrometer, and a control processor assembly. The broach block has a slot disposed to receive the airfoil in an airfoil location. The clamp has a torque-actuated shutoff, and is disposed to lock the airfoil in the broach block slot under a fixed clamping force. The acoustic sensor is disposed adjacent the airfoil location to emit sonic pulses, and the laser vibrometer is oriented towards the airfoil location to sense vibration signatures of the airfoil when excited by the sonic pulses. The control processor assembly is configured to control the acoustic speaker and laser vibrometer, to decompose the sensed vibration signatures into resonant frequencies of the airfoil, and to store the resonant frequencies in a digital storage database, correlated with a unique ID corresponding to the airfoil.

18 Claims, 3 Drawing Sheets

(52) U.S. Cl.
CPC ...... *F05D 2240/12* (2013.01); *F05D 2240/30* (2013.01); *F05D 2260/12* (2013.01)

(58) Field of Classification Search
CPC ......... F05D 2240/122; F05D 2240/123; F05D 2240/124; F05D 2240/125; F05D 2260/12; F04D 2240/30; F04D 2240/301; F04D 2240/302; F04D 2240/303; F04D 2240/304; F04D 2240/305; F04D 2240/306; F04D 2240/307
USPC .......................................... 73/579, 643, 583
See application file for complete search history.

(56) References Cited

U.S. PATENT DOCUMENTS

| | | |
|---|---|---|
| 3,411,344 A | 11/1968 | Lloyd |
| 3,482,159 A | 12/1969 | Clark |
| 4,019,375 A * | 4/1977 | Ellis ........................ G01M 7/00 73/583 |
| 4,389,891 A * | 6/1983 | Fournier ................ G01H 13/00 73/579 |
| 4,919,593 A | 4/1990 | Brown |
| 4,924,706 A | 5/1990 | Moore |
| 5,365,787 A | 11/1994 | Hernandez et al. |
| 5,520,052 A | 5/1996 | Pechersky |
| 5,988,982 A | 11/1999 | Clauer |
| 6,505,130 B1 | 1/2003 | Springer, III et al. |
| 7,876,453 B1 * | 1/2011 | Williams ........... G01N 21/1702 356/502 |
| 7,984,656 B2 | 7/2011 | Nicklous et al. |
| 2005/0041898 A1 | 2/2005 | Yamada et al. |
| 2012/0051911 A1 | 3/2012 | Baik et al. |
| 2014/0197242 A1 | 7/2014 | Shankman |

OTHER PUBLICATIONS

"Vibration measurements on blades of a naval propeller rotating in water with tracking laser vibrometer," Institution of Measurement and Control, Londong, GB. P. Castillini et al. vol. 24, No. 1, Jul. 1, 1998, pp. 43-54.

"Fibre-optic sensors and smart structures: Developments and prospects," Electronics and Communication Engineering Journal, Institution of Electrical Engineers, London, GB., D. Uttamchandani vol. 6, No. 5, Oct. 1, 1994, pp. 237-246.

* cited by examiner

AIRFOIL RESONANT FREQUENCY TESTING

BACKGROUND

The present invention relates generally to gas turbine airfoils, and more particularly to a system and process for testing resonant frequencies of such airfoils.

Airfoils interact with working fluid flow in gas turbine engines. Resonance conditions in such engines can cause damage or otherwise reduce part lifetimes. To prevent damage from harmful resonance conditions, airfoil assemblies (e.g. stages of blades and vanes) are designed to avoid natural frequencies experienced by parts during normal operation.

For each part, manufacturing tolerances typically produce airfoils having a range of resonant frequencies. During engine design, the resonant frequencies of airfoils are sometimes manually tested to ensure that harmful resonance conditions can be avoided. Manual testing systems and methods used during part design are slow, and are not suited to testing a high volume of airfoils during manufacture. Batch testing of a small sample of manufactured airfoils may be inadequate in cases where small variations in airfoils within manufacturing tolerances produce significant effects on assembled blade structures.

SUMMARY

In a first embodiment, the present invention is directed toward a resonant frequency testing system for airfoils. The system comprises a broach block, a clamp, an acoustic speaker, a laser vibrometer, and a control processor assembly. The broach block has a slot disposed to receive an airfoil in an airfoil location. The clamp has a torque-actuated shutoff, and is disposed to lock the airfoil in the broach block slot under a fixed clamping force. The acoustic sensor is disposed adjacent the airfoil location to emit sonic pulses, and the laser vibrometer is oriented towards the airfoil location to sense vibration signatures of the airfoil when excited by the sonic pulses. The control processor assembly is configured to control the acoustic speaker and laser vibrometer, to decompose the sensed vibration signatures into resonant frequencies of the airfoil, and to store the resonant frequencies in a digital storage database, correlated with a unique ID corresponding to the airfoil In a second embodiment, the present invention is directed towards a resonant frequency testing process for airfoils. The process comprises inserting an airfoil into a broach slot, clamping the broach slot to a target clamping force, emitting an acoustic pulse from a speaker adjacent the airfoil, recording resulting vibration signatures of the airfoil using a laser vibrometer, decomposing the vibration signature to determine resonant frequencies of the airfoil, and storing the resonant frequencies of the airfoil in a digital database, correlated with a unique ID of the airfoil.

Figure 1:
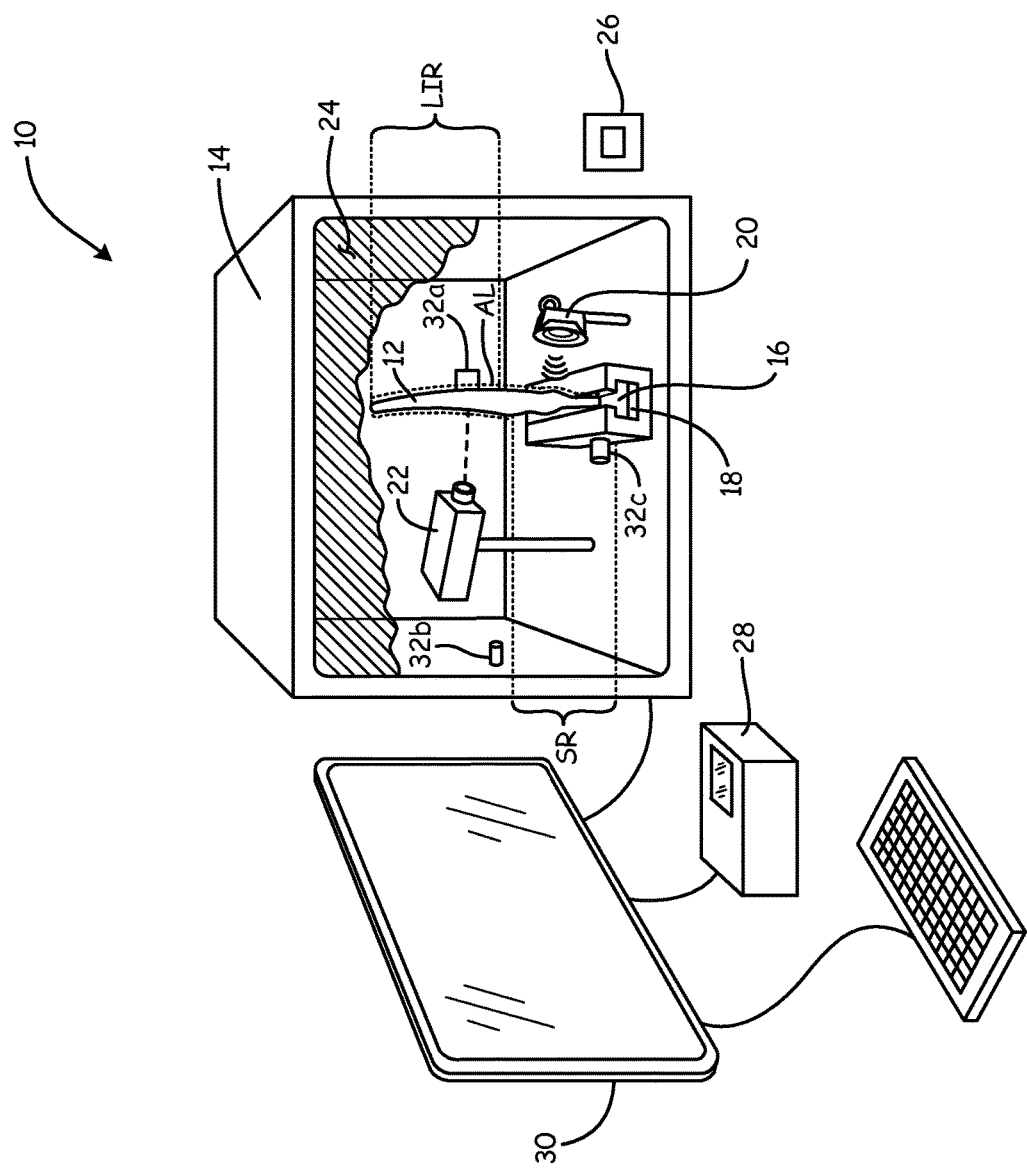
FIG. 1 is a simplified perspective view of an airfoil resonant frequency testing system according to the present invention.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention is directed toward a partially automated blade frequency inspection test (BladeFIT) system and process wherein a blade is anchored using a mechanically actuated broach block and excited with an acoustic speaker. Resulting vibration signatures are recorded with a laser vibrometer. These sensed vibration signatures are then decomposed via fast Fourier transform to identify several frequency modes of interest ($f_{int}$), which are stored in a database correlated to unique blade IDs.

FIG. 1 is a simplified perspective view of BladeFIT system 10, used to test airfoil 12. BladeFIT system 10 comprises enclosure 14, broach block 16, clamp bar 18, speaker 20, laser vibrometer 22, window 24, input device 26, ID reader 28, computer system 30, and temperature sensors 32a, 32b, and 32c. Airfoil 12 is situated at airfoil location AL.

Broach block 16 is a slotted or otherwise contoured retention block shaped to receive airfoil 12 in airfoil location AL, such as by receiving a root section of airfoil 12 having a dovetail, fir tree, or other shape. Airfoil 12 is secured on broach block 16 by clamp bar 18, which applies a clamping force $F_C$ to airfoil 12 that retains airfoil 12 against at least a surface of broach block 16, in airfoil location AL. In at least some embodiments an identification (ID) marker or tag on airfoil 12 is scanned for a unique ID or serial number either before or after resonance frequency testing. (See process 100, described below with respect to FIG. 3). ID scanner 28 can, for example, be a 2D matrix reader. In alternative embodiments the unique ID can be entered manually. Testing results from the BladeFIT system and process are correlated with the unique ID of corresponding airfoils.

Enclosure 14 is a substantially soundproof housing surrounding broach block 16, clamp bar 18, speaker 20, laser interferometer 22, temperature sensors 32a, 32b, and 32c, and airfoil 12 at airfoil location AL. Enclosure 14 is closeable to acoustically isolate airfoil location AL from ambient noise, once airfoil 12 is installed on broach block 16. Window 24 allows an operator to view the interior of enclosure 14 during operation. In at least one embodiment, window 24 is a slideable or otherwise movable cover or door that can be closed to seal enclosure 14, or opened to all installation or extraction of airfoil 12 at airfoil location AL.

Speaker 20 is an acoustic speaker, and laser vibrometer 22 is a vibration sensor. Speaker 20 and laser vibrometer 22 are oriented towards airfoil location AL. The particular regions of airfoil location AL towards which speaker 20 and laser vibrometer 22 are oriented can be configured depending on the geometry of airfoil 12, and on frequency modes of interest $f_{int}$. Acoustic speaker 20 is oriented towards a speaker region SR of airfoil 12, while laser vibrometer 22 is oriented towards a laser interferometer region LIR of airfoil 12. In some embodiments, regions SR and LIR may overlap. In at least one embodiment, speaker region SR is a <30% span region of airfoil location AL (i.e. close to a platform of airfoil 12), and laser interferometer region LIR is a >90% span region of airfoil location AL (i.e. close to a tip of airfoil 12). Speaker 20 is configured to emit acoustic pulses, or "chirps," that vibrationally excite airfoil 12. Laser vibrometer 22 senses vibration of airfoil 12 in response to these acoustic pulses. More particularly, laser vibrometer 22 senses at least one vibration signature $S_V$ of airfoil 12 whenever airfoil 12 is excited by an acoustic pulse from speaker 20. Acoustic pulses emitted by speaker 20 can be varied to excite different modes of airfoil 12. During testing, laser vibrometer 22 can sense several vibration signatures $S_V$ corresponding to different excitations, and/or several vibration signatures $S_V$ at each excitation, for redundancy. Successive acoustic pulses are periodic to improve measurement accuracy by minimizing leakage effects.

Computer system 30 is a logic capable control and processing system. Computer system 30 controls speaker 20, receives vibration signature $S_V$ from laser vibrometer 22, and processes vibration signature $S_V$ as described in greater detail below with respect to FIGS. 2 and 3. Although FIG. 1 depicts computer system 30 as a local terminal, alternative embodiments of computer system 30 can include remote and/or distributed computer systems in communication with speaker 20, vibrometer 22, and temperature sensors 32a, 32b, and 32c. In embodiments of BladeFIT system 10 that include ID reader 28, computer system 30 is further connected to ID reader 28 to receive unique airfoil IDs from ID reader 28. Computer system 30 can further include a local operator interface including input/output (I/O) devices such as a keyboard, mouse, and/or touchscreen. Temperature sensors 32a, 32b, and 32c are situated at various locations within enclosure 14, and provide computer system 30 with measurements of ambient temperature. In the depicted embodiment, temperature sensor 32a directly abuts airfoil 12 at airfoil location AL, temperature sensor 32b is affixed to enclosure 14, and temperature sensor 32c is attached to broach block 16, or otherwise to the fixture of airfoil 12.

In the illustrated embodiment, input device 26 is a palm button disposed near enclosure 14. Input device 26 is used by a human operator to start the resonant frequency testing of airfoil 12, once airfoil 12 has been installed on broach block 16, as described further with respect to FIG. 3, below. After input device 26 is activated, computer system 30 commands speaker 20 to begin a series of acoustic pulses, and receives corresponding sensed vibration signatures $S_V$ from laser vibrometer. In some embodiments, enclosure 14 closes automatically when input device 26 is actuated, so as to acoustically isolate airfoil 12 and laser vibrometer 22 from environmental noise. Other embodiments of enclosure 14 can be closed manually before testing commences.

Figure 2:
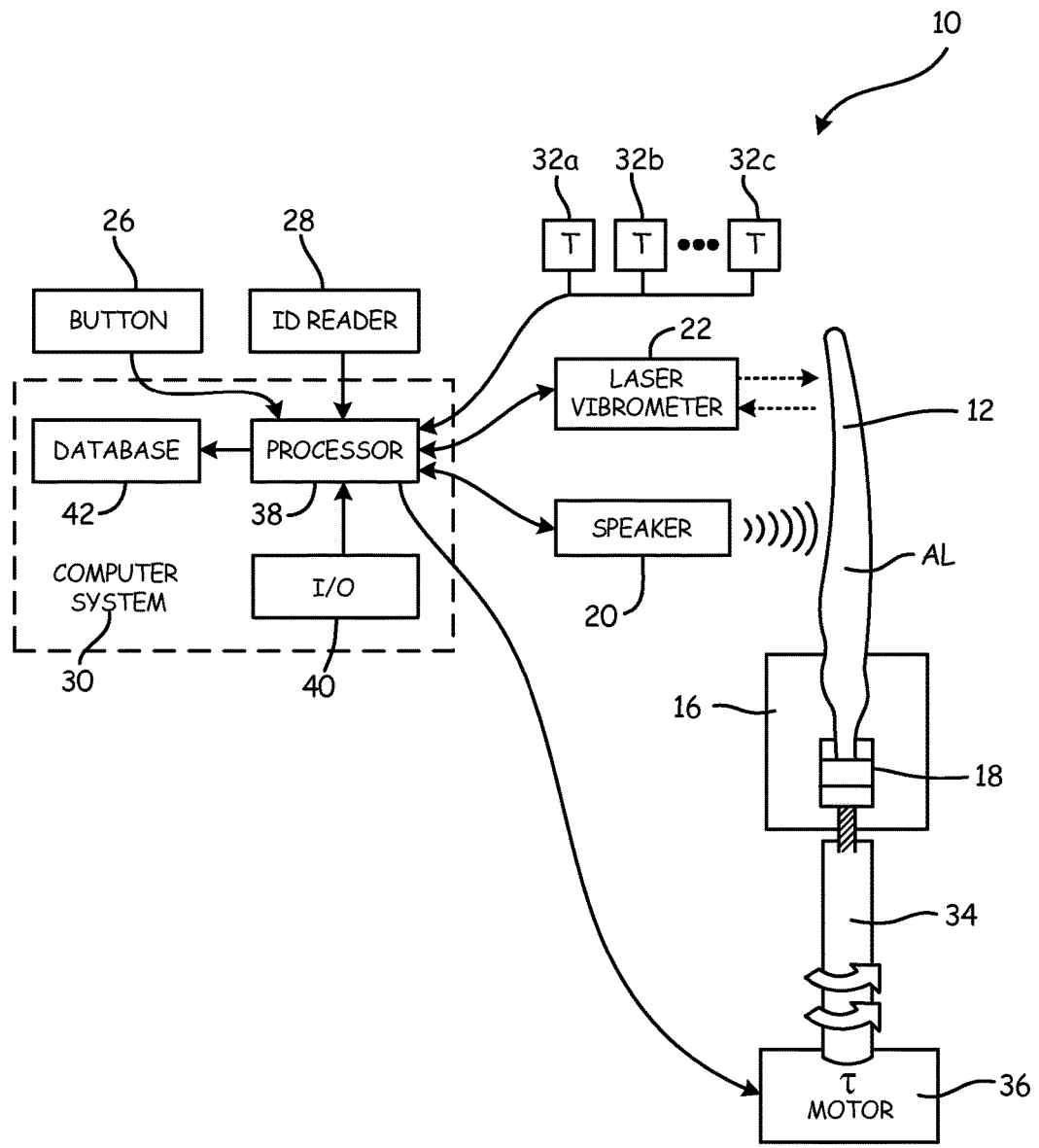
FIG. 2 is a schematic diagram of a subset of the system of FIG. 1.

FIG. 2 a schematic block diagram a portion of BladeFIT system 10 with airfoil 12 at airfoil location AL. FIG. 2 illustrates broach block 16, clamp bar 18, speaker 20, laser vibrometer 22, input device 26, ID reader 28, computer system 30, and temperature sensors 32a, 32b, and 32c as described above with respect to FIG. 1. FIG. 2 further illustrates torque rod 34, torque motor 36, control processor assembly 38, input/output (I/O) system 40, and database 42.

Torque rod 34 is depicted as a screw or threaded rod abutting torque clamp 18. Torque motor 36 can, for example, be an electric motor disposed to apply a torque to rotate torque rod 34, causing torque rod 34 to force clamp bar 18 against airfoil 12, thereby clamping airfoil 12 between broach block 16 and clamp bar 18. Alternative embodiments of broach block 16 and clamp bar 18 can secure airfoil 12 at airfoil location AL in different ways. To ensure consistent vibration measurement, torque motor 36, torque rod 34, and clamp bar 18 cooperate to secure each airfoil 12 with the same fixed, specified clamping force $F_C$. Clamping force $F_C$ is kept constant via torque-actuated shutoff of torque motor 36. When commanded by control processor assembly 38 to secure airfoil 12, torque motor 36 applies up to a maximum torque $\tau_{max}$ corresponding to clamping force $F_C$ to torque rod 34 to tighten clamp bar 18. As clamp bar 18 tightens, the torque required to rotate torque rod 34 increases. When torque motor 36 reaches an output torque equal to maximum torque $\tau_{max}$, torque motor 36 shuts off. Airfoil 12 is thus secured at airfoil location AL with clamping force $F_C$.

Control processor assembly 38 is a logic-capable device or set of devices configured to control speaker 20, receive and process sensed vibration signatures $S_V$ from laser vibrometer 22, and output measured airfoil resonant frequencies $f_R$ correlated with unique airfoil IDs into database 42. In at least one embodiment, control processor assembly 38 is a dedicated application-specific hardware logic processor, microprocessor, or set of processors and/or microprocessors. In other embodiments, control processor assembly 38 can be a generic (i.e. application nonspecific) processor, or set of processors running application-specific software. In some embodiments, different functions of control processor assembly 38 can be performed by distinct hardware sets, which can be situated in different locations.

I/O system 40 can, for example, be a local operator interface system including a computer monitor, keyboard, touchscreen, and/or mouse. I/O system 40 provides means for a human operator to interact with BladeFIT system 10, e.g. to enter or view data, start or stop testing, or perform diagnostics. In some embodiments of BladeFIT system 10, input device 26 is connected to signal control processor assembly 38 to commence airfoil testing, and/or ID reader 28 is connected to control processor assembly 38 to supply unique IDs of tested airfoils. In alternative embodiments, input device 26 and ID reader 28 can be incorporated into I/O system 40, or replaced by elements of I/O system 40.

As discussed previously, computer system 30 decomposes vibration signatures $S_V$ into resonant frequencies $f_R$ corresponding to frequency modes of interest $f_{int}$, and stores these resonant frequencies $f_R$ correlated with unique airfoil IDs. In particular, control processor assembly 38 performs a fast Fourier transform (FFT) on sensed vibration signatures $S_V$, and identifies peaks within the resulting frequency-space signature as resonant frequencies $f_R$. Control processor assembly 38 outputs resonant frequencies $f_R$ to database 42, where each unique airfoil ID is correlated with at least one resonant frequency $f_R$. In at least one embodiment, Control processor assembly 38 only identifies and stores resonant frequencies $f_R$ corresponding to modes of interest $f_{int}$ in database 42.

Figure 3:
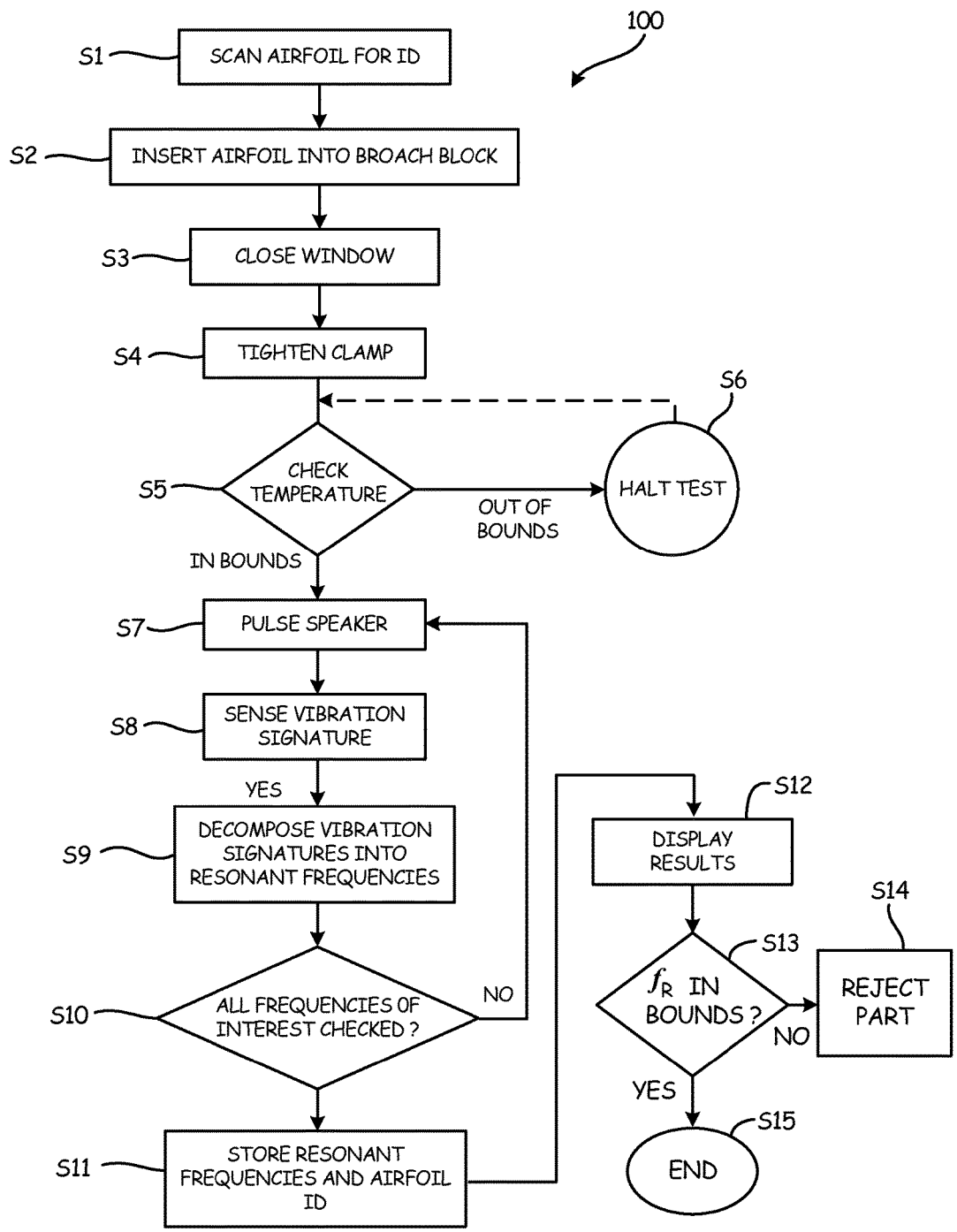
FIG. 3 is a flowchart illustrating a blade testing process using the system of FIG. 1.

FIG. 3 is a flowchart depicting BladeFIT process 100. Process 100 is a process of operating BladeFIT system 10, as described above with respect to FIGS. 1 and 2. Although the steps of process 100 are presented in a fixed order, some steps can be performed in any order, or in more than one order.

In one embodiment, an ID tag or label on airfoil 10 is first scanned at ID reader 28. (Step S1). In alternative embodiments, a unique ID for each airfoil can be retrieved manually. In some embodiments of process 100, step S1 can take place after resonant frequency testing of airfoil 12, rather than before.

Airfoil 12 is inserted into airfoil location AL on broach block 16. (Step S2). Airfoil 12 can be inserted by a human operator, or via an automated process. Once airfoil 12 is installed on broach block 16, enclosure 14 is sealed, e.g. by closing window 24. (Step S3). In some cases window 24 can close automatically when a human operator commences testing by activating or using input device 26. In other cases, enclosure 14 can be closed manually. Torque motor 36 actuates clamp bar 18 to secure airfoil 12. (Step S4). Control processor assembly 38 evaluates temperature readings from temperature sensors 32a, 32b, and 32c. (Step S5). If any of these temperatures fall outside of acceptable ranges, testing is halted. (Step S6). Testing can resume if and only if sensed temperatures return to within acceptable ranges. Acceptable temperature ranges are selected to avoid substantial temperature effects on vibration signatures $S_V$ of airfoils 12, and can for example cover temperatures from approximately 60° F. (~16° C.) to 80° F. (~27° C.). Moreover, sensing temperature can help to insure consistent measurement of different airfoils over time, as temperature conditions may change.

If temperatures fall within acceptable ranges, control processor assembly 38 commands speaker 20 to emit acoustic pulses to as to excite airfoil 12. (Step S7). Acoustic pulses may take the form of single or periodically repeated brief "chirps," or extended tones. Frequencies and amplitudes of acoustic pulses can be selected to excite particular resonant frequency modes, depending on specific geometries of airfoils 12. Laser vibrometer 22 senses the resulting vibrational excitation of airfoil 12 as vibrational signature $S_V$. (Step S8). Sensed vibrational signatures $S_V$ are sent to control processor assembly 38. Control processor assembly 38 then decomposes vibration signatures $S_V$ via FFT, identifies frequency peaks as resonant frequencies as $f_R$, and determines whether frequencies of interest $f_{int}$ are present based on set criteria. (Step S9). Data collection continues in this fashion, until all frequency modes of interest $f_{int}$ have been tested. (Step S10). For each airfoil 12, resonant frequencies $f_R$ are then stored in database 42 together with corresponding unique airfoil IDs. (Step S11). Enclosure 14 then opens (e.g. via window 24), and I/O system 40 displays the results of the test via a graphical user interface (GUI) using a basic color coding scheme. (Step S12). Processor 38 evaluates whether measured resonant frequencies $f_R$ fall within acceptable bounds. (Step S13). If not, airfoil 12 is rejected. (S14). Otherwise, stored resonant frequencies $f_R$ can be used to determine the eventual placement of airfoil 12 in an engine, and method 100 terminates. (S15). Method 100 can be repeated, as needed, to successively evaluate multiple airfoils.

The present invention provides a partially automated system and process for testing the resonant frequencies of turbine airfoils. This process is both faster and more consistent than manual testing, and accordingly allows resonant frequency testing to be incorporated into manufacturing processes for gas turbine engines.

Discussion of Possible Embodiments

The following are non-exclusive descriptions of possible embodiments of the present invention.

A resonant frequency testing system for an airfoil, the system comprising: a broach block with a slot disposed to receive the airfoil in an airfoil location; a clamp with a torque-actuated shutoff, disposed to lock the airfoil in the broach block slot under a fixed clamping force; an acoustic speaker disposed adjacent the airfoil location to emit sonic pulses; a laser vibrometer oriented towards the airfoil location to sense vibration signatures of the airfoil when excited by the sonic pulses; and a control processor assembly configured to control the acoustic speaker and laser vibrometer, to decompose the sensed vibration signatures into resonant frequencies of the airfoil, and to store the resonant frequencies in a digital storage database, correlated with a unique ID corresponding to the airfoil.

The system of the preceding paragraph can optionally include, additionally and/or alternatively, any one or more of the following features, configurations and/or additional components:

A further embodiment of the foregoing system, further comprising an ID reader configured scan the airfoil and supply the control processor assembly and digital storage database with the unique ID.

A further embodiment of the foregoing system, wherein the ID reader is a 2D matrix reader.

A further embodiment of the foregoing system, wherein the laser vibrometer is oriented towards a >90% span region of the airfoil.

A further embodiment of the foregoing system, wherein the acoustic speaker is oriented towards a <30% span region of the airfoil.

A further embodiment of the foregoing system, further comprising one or more temperature sensors disposed to sense ambient temperature, and wherein the control processor assembly is further configured to actuate neither the acoustic speaker nor the laser vibrometer if any of the temperature sensors reports a temperature outside of a specified range.

A further embodiment of the foregoing system, wherein the temperature sensors include a first temperature sensor disposed on airfoil, a second temperature sensor disposed on the broach block, and a third temperature sensor disposed on an enclosure surrounding the broach block, the clamp, the acoustic speaker, and the laser vibrometer.

A further embodiment of the foregoing system, further comprising a closeable substantially soundproof enclosure surrounding the airfoil location, the broach block, laser vibrometer, and the acoustic speaker.

A further embodiment of the foregoing system, wherein the clamp comprises a clamp bar loaded to clamp the airfoil by applying up to a fixed maximum torque to a screw abutting the clamp bar.

A further embodiment of the foregoing system, wherein the clamp further comprises an electric torque motor disposed to apply up to the fixed maximum torque to the screw.

A further embodiment of the foregoing system, wherein decomposing the sensed vibration signatures into resonant frequencies comprises performing a fast Fourier transform on the sensed vibration signatures, and identifying frequency peaks of a resulting transformed frequency signature.

A resonant frequency testing process for an airfoil, the process comprising: inserting the airfoil into a broach slot; clamping the broach slot to a target clamping force; emitting an acoustic pulse from a speaker adjacent the airfoil; recording vibration signatures of the airfoil when excited by the acoustic speaker, using a laser vibrometer; decomposing the vibration signature to determine resonant frequencies of the airfoil; and storing the resonant frequencies of the airfoil in a digital database, correlated with a unique ID of the airfoil.

The process of the preceding paragraph can optionally include, additionally and/or alternatively, any one or more of the following features, configurations and/or additional components:

A further embodiment of the foregoing process, further comprising scanning the airfoil to determine the ID.

A further embodiment of the foregoing process, wherein scanning the airfoil to determine the ID comprises scanning an identification tag on the airfoil with a 2D matrix reader.

A further embodiment of the foregoing process, wherein the speaker is oriented towards a <30% span region of the airfoil when emitting the acoustic pulse.

A further embodiment of the foregoing process, wherein the laser vibrometer is oriented towards a >90% span region of the airfoil when recording vibration of the airfoil.

A further embodiment of the foregoing process, wherein clamping the broach slot comprises actuating a torque motor driving a screw abutting a clamp bar.

A further embodiment of the foregoing process, wherein the torque motor includes a torque cutoff, such that the torque motor ceases to drive the screw when a target torque is reached.

A further embodiment of the foregoing process, wherein decomposing the vibration signature comprises performing a fast Fourier transform on the vibration signature, and identifying frequency peaks of a resulting transformed frequency signature.

A further embodiment of the foregoing process, further comprising closing a substantially soundproof enclosure surrounding the airfoil, the broach slot, the laser vibrometer, and the speaker before emitting the acoustic pulse.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A resonant frequency testing system for an airfoil, the system comprising:
   a broach block with a slot disposed to receive the airfoil in an airfoil location;
   a clamp with a torque-actuated shutoff, disposed to lock the airfoil in the broach block slot under a fixed clamping force;
   an acoustic speaker disposed adjacent the airfoil location to emit sonic pulses;
   a laser vibrometer oriented towards the airfoil location to sense vibration signatures of the airfoil when excited by the sonic pulses;
   a control processor assembly configured to control the acoustic speaker and laser vibrometer, to decompose the sensed vibration signatures into resonant frequencies of the airfoil, and to store the resonant frequencies in a digital storage database, correlated with a unique ID corresponding to the airfoil; and
   one or more temperature sensors disposed to sense ambient temperature, and wherein the control processor assembly is further configured to actuate neither the acoustic speaker nor the laser vibrometer if any of the one or more temperature sensors reports a temperature outside of a specified range.

2. The resonant frequency testing system of claim 1, further comprising an ID reader configured scan the airfoil and supply the control processor assembly and digital storage database with the unique ID.

3. The resonant frequency testing system of claim 2, wherein the ID reader is a 2D matrix reader.

4. The resonant frequency testing system of claim 1, wherein the laser vibrometer is oriented towards a >90% span region of the airfoil.

5. The resonant frequency testing system of claim 1, wherein the acoustic speaker is oriented towards a <30% span region of the airfoil.

6. The resonant frequency testing system of claim 1, wherein the temperature sensors include a first temperature sensor disposed on the airfoil, a second temperature sensor disposed on the broach block, and a third temperature sensor disposed on an enclosure surrounding the broach block, the clamp, the acoustic speaker, and the laser vibrometer.

7. The resonant frequency testing system of claim 1, further comprising a closeable soundproof enclosure surrounding the airfoil location, the broach block, laser vibrometer, and the acoustic speaker.

8. The resonant frequency testing system of claim 1, wherein the clamp comprises a clamp bar loaded to clamp the airfoil by applying up to a fixed maximum torque to a screw abutting the clamp bar.

9. The resonant frequency testing system of claim 8, wherein the clamp further comprises an electric torque motor disposed to apply up to the fixed maximum torque to the screw.

10. The resonant frequency testing system of claim 9, wherein decomposing the sensed vibration signatures into resonant frequencies comprises performing a fast Fourier transform on the sensed vibration signatures, and identifying frequency peaks of a resulting transformed frequency signature.

11. A resonant frequency testing process for an airfoil, the process comprising:
    inserting the airfoil into a broach slot;
    clamping the broach slot to a target clamping force by actuating a torque motor driving a screw abutting a clamp bar;
    emitting an acoustic pulse from a speaker adjacent the airfoil;
    recording vibration signatures of the airfoil when excited by the acoustic speaker, using a laser vibrometer;
    decomposing the vibration signature to determine resonant frequencies of the airfoil; and
    storing the resonant frequencies of the airfoil in a digital database, correlated with a unique ID of the airfoil.

12. The process of claim 11, further comprising scanning the airfoil to determine the ID.

13. The process of claim 12, wherein scanning the airfoil to determine the ID comprises scanning an identification tag on the airfoil with a 2D matrix reader.

14. The process of claim 11, wherein the speaker is oriented towards a <30% span region of the airfoil when emitting the acoustic pulse.

15. The process of claim 11, wherein the laser vibrometer is oriented towards a >90% span region of the airfoil when recording vibration of the airfoil.

16. The process of claim 11, wherein the torque motor includes a torque cutoff, such that the torque motor ceases to drive the screw when a target torque is reached.

17. The process of claim 11, wherein decomposing the vibration signature comprises performing a fast Fourier transform on the vibration signature, and identifying frequency peaks of a resulting transformed frequency signature.

18. The process of claim 11, further comprising closing a soundproof enclosure surrounding the airfoil, the broach slot, the laser vibrometer, and the speaker before emitting the acoustic pulse.

* * * * *